United States Patent [19]

Hayashi

[11] 3,801,744

[45] Apr. 2, 1974

[54] AUTOMATIC TELEPHONE RECORDER CONTROLLING DEVICE SENSITIVE TO CALLING SUBSCRIBER INTERRUPTION OF SERVICE

[75] Inventor: Keizo Hayashi, Tokyo, Japan

[73] Assignee: Tokyo Rokuon Kogyo Kabushiki Kaisha, Tokyo, Japan

[22] Filed: July 24, 1972

[21] Appl. No.: 274,264

[30] Foreign Application Priority Data

Aug. 30, 1971 Japan .............................. 46-65823

[52] U.S. Cl. ................................ 179/6 R, 179/2 A

[51] Int. Cl. ........................................... H04m 1/64

[58] Field of Search ....... 179/6 R, 6 AC, 2 A, 84 R, 179/84 A

[56] References Cited

UNITED STATES PATENTS

| | | | |
|---|---|---|---|
| 3,485,952 | 12/1969 | Walker | 179/2 A |
| 3,146,310 | 8/1964 | Jeffries et al. | 179/6 R |
| 2,912,504 | 11/1959 | Pagnall | 179/6 R |

FOREIGN PATENTS OR APPLICATIONS

| | | | |
|---|---|---|---|
| 1,157,092 | 7/1969 | Great Britain | 179/6 R |

*Primary Examiner*—Raymond F. Cardillo, Jr.

[57] ABSTRACT

An automatic telephone recorder controlling device is provided which includes circuitry for detecting a voltage impulse produced in the telephone lines upon interruption of service by a calling subscriber. The recorder includes a semiconductor element which is rendered conductive upon occurrence of a ringing on the telephone lines and controls the operation of the recorder. The voltage impulse detected upon interruption of service by a calling subscriber is used to render the semiconductor non-conductive to stop the operation of the recorder.

4 Claims, 2 Drawing Figures

AUTOMATIC TELEPHONE RECORDER CONTROLLING DEVICE SENSITIVE TO CALLING SUBSCRIBER INTERRUPTION OF SERVICE

BACKGROUND OF THE INVENTION

The invention relates to an automatic telephone recorder controlling device which is adapted to control an automatic telephone recorder during the absence of any attendant by deriving a control signal from a voltage impulse that is produced when the d. c. speaking circuit is interrupted through an exchange upon completion and interruption of a call by a calling subscriber. An automatic telephone recorder is known which is operative during the absence of any attendant to a telephone set to record the message transmitted from a calling subscriber and to stop the recorder automatically several seconds after the completion of the call. Such time delay is necessary to avoid the inconvenience which way otherwise be caused by a momentary pause in the message to stop the recorder prematurely.

However, recent telephone circuit development has resulted in the construction of circuitry for improved service efficiency such that a busy tone is transmitted from an exchange as a warning signal to indicate "switch off immediately" unless the receiving subscriber immediately hung up the receiver when the calling subscriber has interrupted the service. This results in a crucial default of an automatic telephone recorder incorporating a time delay, since the busy tone is effective to operate the recorder continnously, which therefore cannot be stopped. Thus the automatic recording system of the kind initially mentioned can no longer be used in modern telephone systems.

SUMMARY OF THE INVENTION

The invention eliminates the above disadvantage of the prior art by providing an automatic telephone recorder controlling device which detects a voltage impulse produced upon interruption of service by a calling subscriber and utilizes the impulse to control the mechanism of the recorder.

BRIEF DESCRIPTION OF THE DRAWINGS

The invention will be described more fully below with reference to the drawings, in which:

Referring to FIG. 1, a pair of telephone lines $L_1$ and $L_2$ are shown connected through a capacitor $C_O$ with the primary winding $N_1$ of a coupling transformer T which forms a communication loop. A full wave rectifier comprising diodes $D_1$, $D_2$, $D_3$ and $D_4$ is connected across the telephone through a series circuit including a capacitor $C_1$ and a resistor $R_1$ on the one hand and through another series circuit including a capacitor $C_2$, a resistor $R_2$ and the break side of the contact Y1A of a relay Y-1 to be described later on the other. Across the output of the rectifier is connected a variable resistor $VR_1$ haveing a movable contact which is connected with the base of a PNP transistor $Q_1$, the emitter of which is connected to ground through a resistor. The base of the transistor $Q_1$ is also connected to the ground through a capacitor $C_3$ and a resistor $R_3$, respectively.

Figure 1:
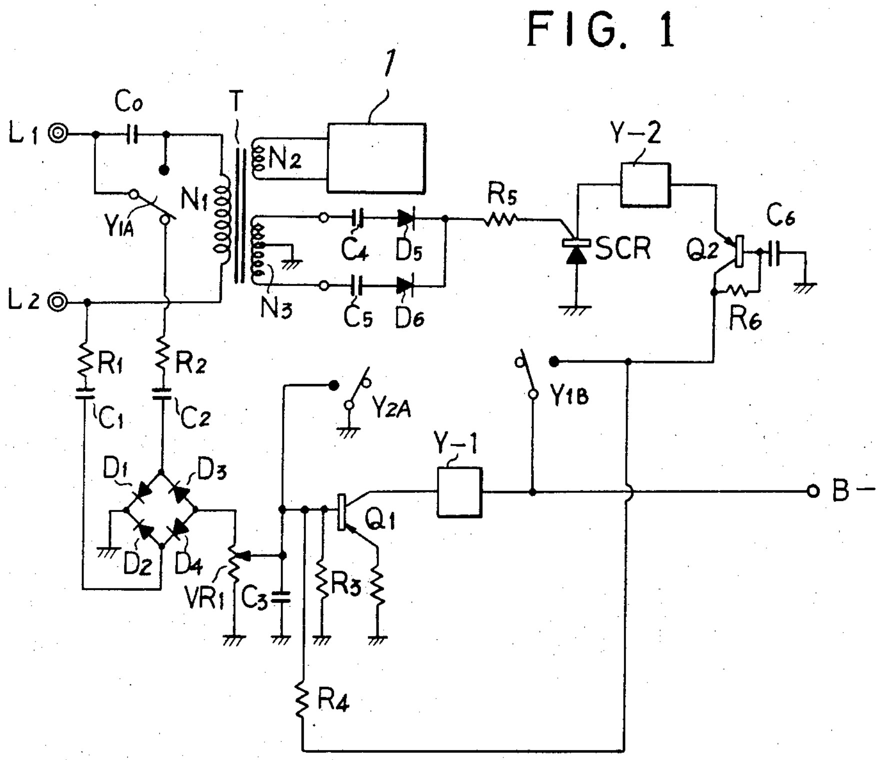
FIG. 1 is a wiring diagram of an embodiment of the controlling device according to the invention.

The collector of the transistor $Q_1$ is connected with a power supply B- through the relay Y-1 which controls the recording and reproducing circuit of an automatic telephone recorder with which the present circuit is associated. In addition, the base of the transistor $Q_1$ is connected through a resistor $R_4$ and a self-holding contact Y1B of the relay Y-1 with the power supply B- for maintaining the recorder operative during the period of a connected service.

The coupling transformer T has a first secondary winding $N_2$ which is connected with the recording and reproducing circuit 1 and a second secondary winding $N_3$ which is provided for detecting a voltage impulse produced upon interruption of service by a calling subscriber. The second secondary winding $N_3$ has a center tap which is grounded and has its opposite ends connected through capacitors $C_4$, $C_5$ and diodes $D_5$, $D_6$, respectively, to a resistor $R_5$ which is connected with the gate of a thyristor SCR. The thyristor SCR has its anode connected to ground and its cathode in series with a relay Y-2 and the emitter of another PNP transistor $Q_2$. The relay $Y_2$ has its relay contact Y2A connected between ground and the base of the transistor $Q_1$ for holding the base of this transistor at ground potential to cut off this transistor when the relay Y-2 is energized. The transistor $Q_2$ forms a delay circuit and has its collector connected through the contact Y1B of the relay Y-1 with the power supply B-. The base of the transistor $Q_2$ is connected to ground through a capacitor $C_6$, and a resistor $R_6$ is connected across the base and the collector of the transistor $Q_2$. The capacitor $C_6$ and resistor $R_6$ have a time constant on the order of 0.1 to 1 second.

In operation, upon occurrence of a ringing from a calling subscriber across the telephone lines $L_1$ and $L_2$, that ringing is fed through the series circuits $R_1$, $C_1$ and $R_2$, $C_2$ to be rectified by the rectifier, whereby a voltage of a pre-set level is produced across the movable contact of the variable resistor and ground, which voltage is applied to the base of the transistor $Q_1$ to render it conductive, thus energizing the relay Y-1. When the relay Y-1 is energized, its contact Y1A short-circuits the capacitor $C_O$ to complete the communication loop, whereby the bell signal is interrupted. At the same time the contact Y1B also provides a bias to the base of the transistor $Q_1$ through the resistor $R_4$, thereby maintaining energization of the relay Y-1. The relay Y-1 controls the actuation of a motor, plunger or the like in the recording and reproducing circuit 1 to start the recorder. An answer is transmitted from the secondary winding $N_2$, and the recorder records the message from the calling subscriber.

When the calling subscriber completes sending his message and switches off by placing his handset upon the hook, a voltage impulse of great magnitude is momentarily produced across the lines $L_1$ and $L_2$, which induces a voltage on the secondary. Such voltage is effective to apply through either diode $D_5$or $D_6$ a positive voltage of sufficient magnitude to the gate of the thyristor SCR to cause its conduction, whereby the relay Y-2 is energized. When the relay Y-2 is energized, its contact Y2A connects the base of the transistor $Q_1$ to ground, so that transistor $Q_1$ is cut off and the relay Y-1 is deenergized to interrupt the operation of components within the recording and reproducing circuit 1.

The delay circuit comprising the transistor $Q_2$, capacitor $C_6$ and resistor $R_6$ is effective to delay the energization of the relay Y-2 until 0.5 to 1 second after the energization of the relay Y-1, since application of B-voltage to the relay Y-2 by the contact Y1B may cause a premature conduction of the thyristor SCR as a result of a voltage impulse which may be produced in the circuit upon making of the contact Y1A.

As is known, telephone lines have respective positive and negative polarities, and hence a connection of the telephone lines with the coupling transformer T may result in the generation of either positive or negative voltage impulse across the secondary winding $N_3$ when service is interrupted by the calling subscriber. However, the provision of a grounded center tap on the secondary winding $N_3$ and a pair of similarly poled diodes $D_5$ and $D_6$ connected to the opposite ends of this winding assures that the gate of the thyristor SCR is always triggered with a positive voltage.

Figure 2:
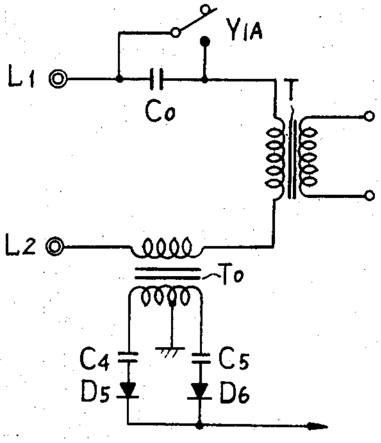
FIG. 2 is a wiring diagram of part of another embodiment of the invention.

FIG. 2 shows another embodiment of the invention in which a transformer $T_0$ for detecting the voltage impulse is provided separately from and connected in series with the coupling transformer on the primary side. The secondary side of transformer $T_0$ is similarly connected through capacitors $C_4$, $C_5$ and diodes $D_5$, $D_6$ as in FIG. 1. The operation remains unchanged.

As described above, the device according to the invention is constructed so that it detects a voltage impulse produced upon interruption of a service by a calling subscriber and utilizes the impulse to cause conduction of a thyristor which may be replaced by any equivalent means. The conduction of the thyristor energizes a relay which has its contact connected to short-circuit the bias circuit of a controlling transistor. Consequently, at the instant that a calling subscriber hangs up his telephone, the automatic telephone recorder on the receiving side is positively stopped to avoid a wasteful running of the recording tape after termination of service. This control is achieved with a simple circuit arrangement. It should be noted that the invention can be applied in similar applications other than an automatic telephone recorder which is designed to be operative during absence of any attendant.

What I claim is:

1. A controlling device for an automatic telephone recorder having a recording and reproduction circuit, said device comprising: a ring signal detecting means formed by a rectifier circuit connected across a pair of telephone lines; a first relay energized by an output of said detecting means for controlling operation of said recording and reproducing circuit; a coupling transformer having a primary winding; a contact of said first relay connected to said telephone lines so as to form a communication path between said telephone lines and said recording and reproduction circuit when said first relay is energized; a first secondary winding of said coupling transformer connected to said recording and reproducing circuit coupling said telephone lines to said recording and reproduction circuit; a second secondary winding of said coupling transformer across which a voltage impulse is induced when a pulse is momentarily produced across said telephone lines in response to interruption of the service by a calling subscriber; means for obtaining a trigger signal of a predetermined polarity from said voltage impulse; a semiconductor element triggered by said trigger signal; a second relay for controlling operation of the first relay when said semiconductor is triggered into conduction by said trigger signal: and a delay dircuit for permitting energization of said second relay at a predetermined delay time after the said first relay is energized.

2. A controlling device according to claim 1, in which said means for obtaining the trigger signal comprises a pair of diodes one connected to each end of the second secondary winding of the coupling transformer, the center tap of the said secondary winding being grounded.

3. A controlling device according to claim 1, in which said means for obtaining the trigger signal comprises a pair of diodes one connected to each end of a secondary winding of second transformer, the primary winding of said second transformer being connected in series with the primary winding of said coupling transformer.

4. A controlling device according to claim 1, in which said delay circuit comprises a transistor having its emitter connected to said semiconductor element through said second relay and a resistor connected across the base and the collector of the transistor and a capacitor connected between the base of the transistor and the ground.

* * * * *